2 Sheets--Sheet 1.

J. HOLLINGSWORTH.
Horse Hay-Rakes.

No. 152,230. Patented June 23, 1874.

Witnesses:
James Martin Jr.
J. N. Campbell

Inventor:
James Hollingsworth
by
Wilson, Fenwick & Lawrence

2 Sheets--Sheet 2.

J. HOLLINGSWORTH.
Horse Hay-Rakes.

No. 152,230. Patented June 23, 1874.

Witnesses:

Inventor:

UNITED STATES PATENT OFFICE.

JAMES HOLLINGSWORTH, OF CHICAGO, ILLINOIS.

IMPROVEMENT IN HORSE HAY-RAKES.

Specification forming part of Letters Patent No. 152,230, dated June 23, 1874; application filed February 14, 1874.

*To all whom it may concern:*

Be it known that I, JAMES HOLLINGSWORTH, of Chicago, in the county of Cook and State of Illinois, have invented a new and useful Improvement in Horse Hay-Rakes; and I do hereby declare that the following is a full, clear, and exact description thereof, reference being had to the accompanying drawings making part of this specification, in which—

Figure 1:
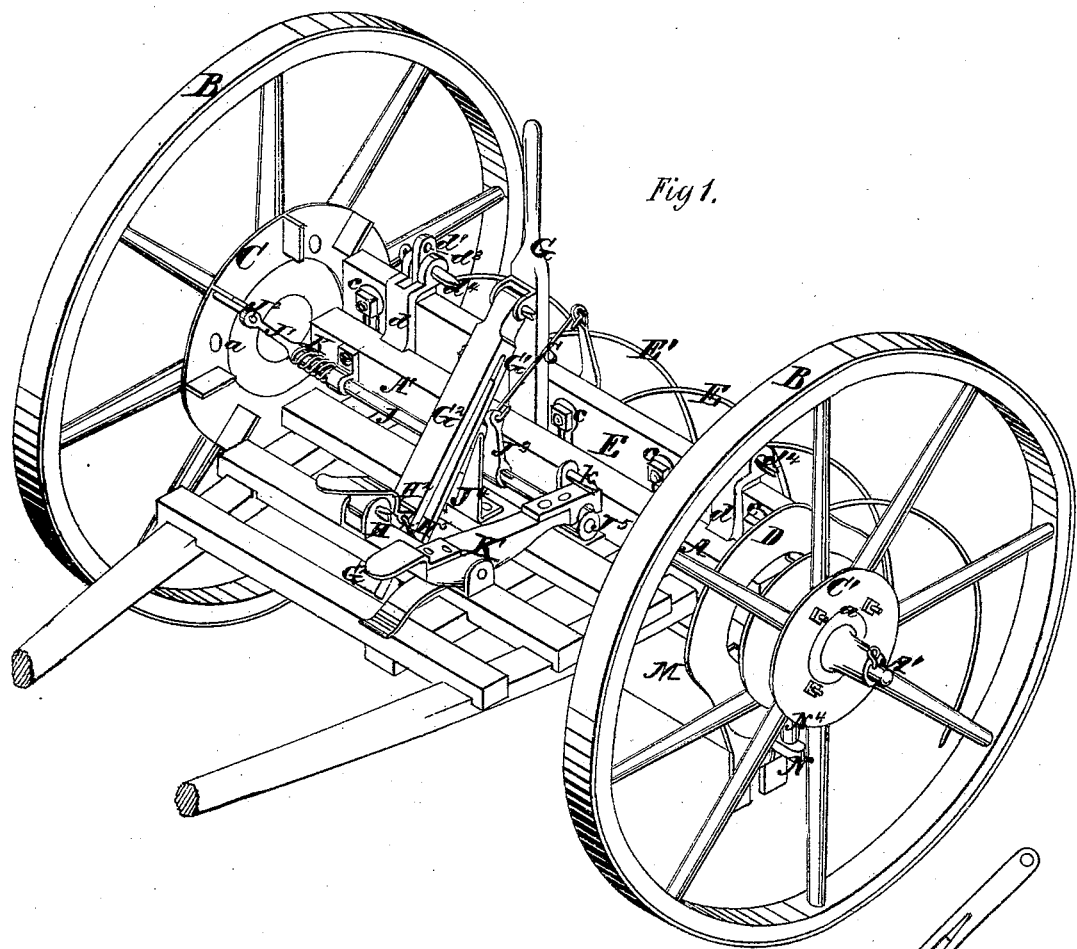
Figures 2, 3:
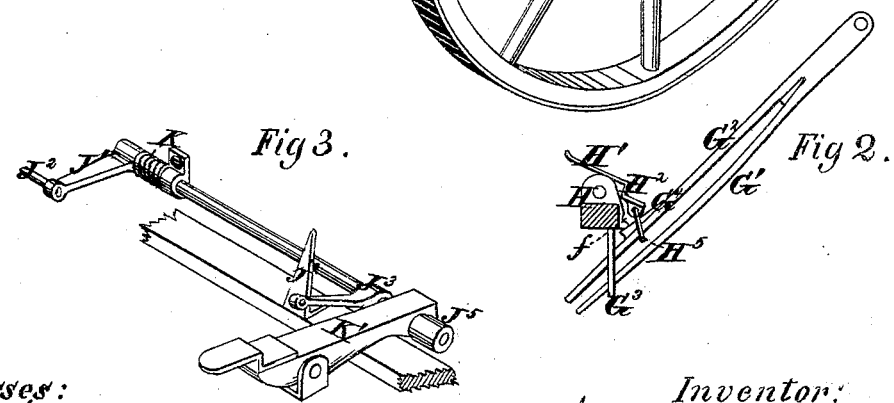
Figure 4:
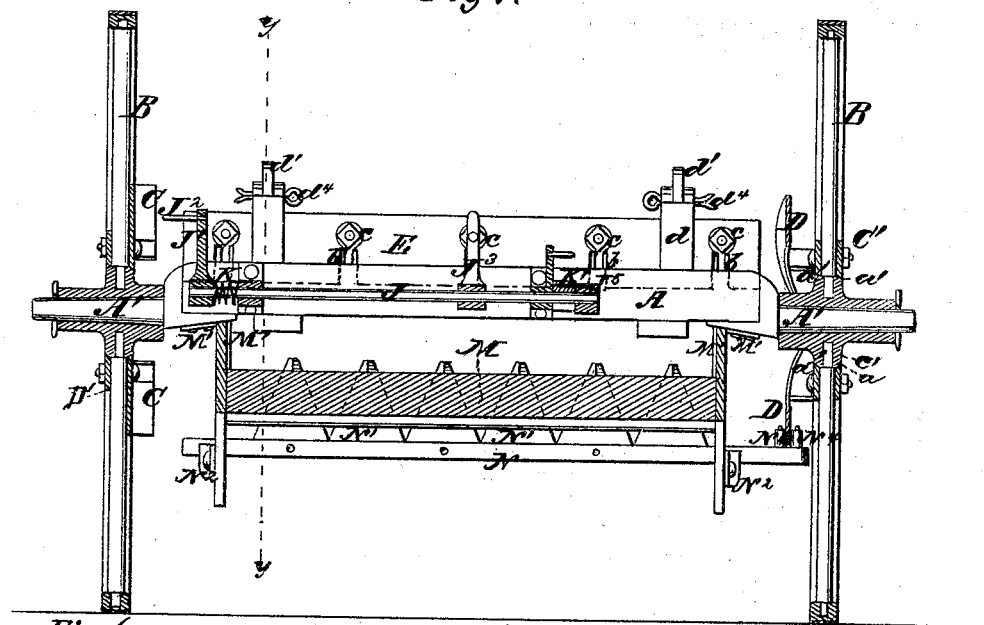
Figures 5, 6:
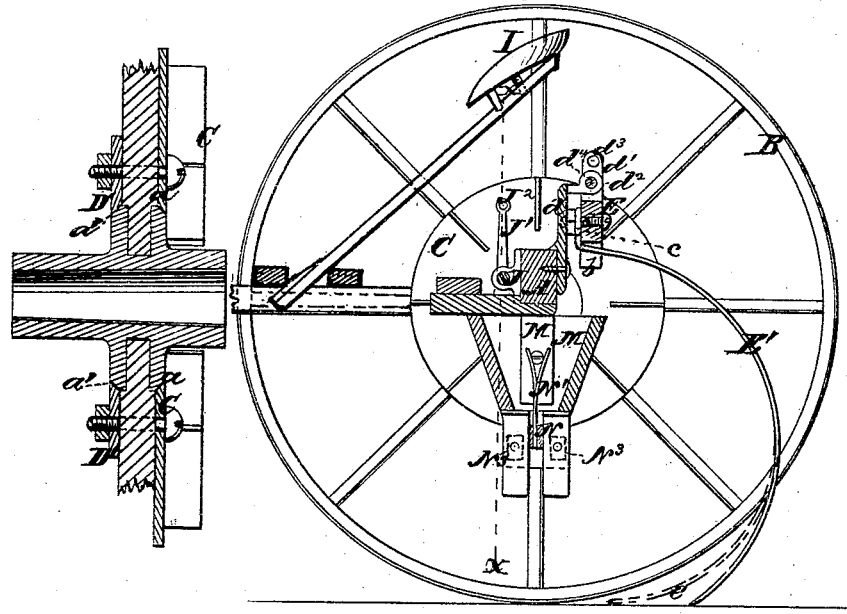

Figure 1 is a perspective view of my improved rake with a plaster or fertilizer distributer attached to it. Fig. 2 is a section of the releasing foot-treadle and locking device combined with it. Fig. 3 is a perspective view of the devices which are combined with the rake to make it self tripping or unloading. Fig. 4 is a vertical transverse section in the line $x\,x$ of Fig. 5. Fig. 5 is a vertical longitudinal section of a portion of the machine in the line $y\,y$ of Fig. 4. Fig. 6 is a vertical section of one of the hubs of the traction-wheels, showing parts of the spokes and the plate which automatically trips the rake-head.

The nature of my invention consists, first, in the combination of hinging-irons of the rake-head, having two or more eyes, with the perforated goose-necks, whereby the rake-teeth can be adjusted to clean grain-stubble as well as grass lands. Second, it consists in the combination of a backwardly-depressible foot-treadle, binding-loop, a spring locking-bar hinged to the hand-lever, and a locking device, whereby the teeth can be held down to their work, and, when desired, can be released by the foot, so as to be raised either by hand or power of the team. Third, it consists in making the backwardly-depressible lever with a heel-seat for the purpose of fitting the shoe, and also preventing forward slip thereof when the backward depression of the treadle is desired. Fourth, it consists in the sliding spring crank-shaft having two arms, in combination with the rake-head, trip-plate of one of the traction-wheels, the forward depressible foot-treadle, locking-collar, and inclined releasing-trip, whereby the rake, at will, can be operated by the power of the team. Fifth, it consists in the construction of the tripping hub-plate, whereby it can be applied very expeditiously and accurately on one of the wheels of the rake.

To enable others skilled in the art to make and use my invention, I will proceed to describe the same with reference to the drawings.

A is the main or wooden portion of the axle, and $A'\,A'$ the short metal arms or spindles attached eccentrically to the ends thereof; B B, the traction-wheels, made, as usual, light and with narrow treads. C is the tripping-plate, which automatically trips the rake-head. The plate C is cast with a centering-eye, $a$, through its center, and this eye is beveled inward, as shown. By this construction, the plate C can be slipped upon the hub of one of the wheels and centered in an instant, and bolted truly in position by means of bolts passed through the plate, and through a washer clamp-plate, $D'$, which is also constructed with an eye, $a'$, as shown. The trip-plate and its washer clamp-plate are well known; but this way of constructing them with centering-eyes $a\,a'$ is new and very useful. E is the rake head or bar, to which the teeth are attached, and by which they are guided vertically and stayed against lateral displacement. This bar is in vertical section very deep, as compared with its thickness horizontally. This is so in order to get depth for guiding-slots $b$ cut upward into it from the lower edge; also, to afford surface above the slots upon which to rest and fasten the upper eye ends of the teeth, as shown. Another object is to get the hinging-points of the bar as high above the curved back portions of the teeth as possible. In the drawing, Figs. 4 and 5 show the manner in which the teeth $E'$ are guided in the slots $b$, and are fastened to the front of the bar at $c$, and that the bar with teeth is hinged to the goose-neck overhanging brackets $d$, which extend up from the back of the main axle, as will be clearly seen; and it will be evident that this simple and effective construction and arrangement has many advantages, among which are the teeth. Besides being guided and stayed both vertically and laterally, they are, when raised, thrown directly backward, and thereby relieved from the elastic pressure of the compressed load of grass, and consequently can be discharged with much less labor. The arrangement also permits of the highest working part of the tooth being between the upper and lower edges of the bar, and the points of the teeth can be brought nearly directly under the hinges of said bar, so as to take hold of the hay more effectually, as illustrated by the dotted lines at $e$. The bar is also very light. The eye-bearings or hinging-irons $d^1$, to which the goose-necks are hinged, and which are inserted in the top of the bar E, are made with two eyes, $d^2\ d^3$, in order that the rake-head with teeth may be raised or lowered to suit the stubble-gleaning or grass-land-raking operations. Through the eyes of the bearings and goose-neck brackets split spring-pivots $d^4$ are inserted, and these can be readily removed to make the adjustments desired. For operating the rake-head, a nearly upright hand-lever, G, is fastened to its front side, and to the front of this lever a forked bar, $G^1\ G^2$, is hinged. This bar has its part $G^1$ made like a spring, and its part $G^2$ may be comparatively rigid. This bar hangs downward and forward, and both of its prongs are confined within a stationary staple, $G^3$, on the frame, against which the spring portion bears with a backward force. On the front of the part $G^2$ of this bar a beveled latch, $G^4$, is constructed, and directly opposite this latch a bearing or support, H, for a foot-treadle, $H^1$, is arranged upon one of the front cross-pieces of the rake-frame. The back of this bearing is slightly notched or grooved, as at $f$, in order to retain the latch $G^4$ when the rake-head is locked to its working position. To the bearing H the treadle is pivoted, and from near the pivot, backward, the treadle is made of an angular form or with a depressed surface, as at $H^2$. The rear end of the treadle is looped to the rigid portion $G^2$ of the bar by means of a swinging loop, $H^5$, as shown. By means of the bar $G^1\ G^2$ and its latch, the rake can be firmly locked down to its work, and then by means of the treadle the operator, who sits upon the seat I, with a downward depression of the rear part of the treadle can readily release the rake for being elevated by the operator with the hand-lever. On depressing the treadle its rear end bears against the bevel on the part $G^2$ of the bar, and thereby forces the catch out of contact with the groove or notch of the bearing-piece of the treadle, and at the same time compresses the spring part $G^1$ of the bar, and brings the bar $G^1\ G^2$ in condition for automatically latching upon the bearing of the treadle when the rake is again lowered for a new load, the recoil of the spring part $G^1$ causing the relatching to take place. In order to discharge the rake by the power of the horse, a rod, J, is fitted to the front of the axle in bearings, so as to slide laterally back and forth. One of the lateral movements is produced by a spiral spring, K, arranged between the arm and a bearing of the rod, as shown. On one end of this rod an arm, $J^1$, is attached, on the end of which is a trip-pin, $J^2$. This pin comes between the flange projections of the plate C, and said flanges, respectively, turn the rod one-quarter round. In order to slide the rod back out of connection with the flanges, and also connect the rod with the rake-head, another arm, $J^3$, is attached to the rod, and directly in front of this arm an inclined stationary trip-plate, $J^4$, is fastened to one of the cross-bars of the frame of the rake. The arm $J^3$ strikes the inclined side of the trip $J^4$ as the rod is drawn round by a flange of the hub-plate C, and is moved laterally out of gear with the flange. This arm is connected to the rake-head by means of the link S, and as the rod J is turned by the flange-plate, this arm draws upon the link S, and raises the rake. On the end of the rod J a collar, $J^5$, is fastened, and this collar acts as a stop to hold the rod in the position in which the incline trip adjusts it. This is effected by pivoting a treadle, $K'$, to one of the cross-bars of the frame in front of the rod, and having its rear end extend back over the rod. In this extended end on the under side a semicircular groove is cut, and this grooved portion fits down upon the rod on one side of the collar, and prevents the rod from being moved laterally toward the flanged plate by the spiral spring K. To release the rod, and allow the spring to act, the treadle is depressed at its forward end, so as to have its grooved rear end clear the collar. In order to prevent the rear end of the treadle from rising too high, a split spring-pin stop, $k$, is arranged above said end, as shown.

I have represented in the drawings a fertilizer-distributer; but, as I have applied for a separate patent on the said distributer, I do not claim the same under this patent.

What I claim, and desire to secure by Letters Patent, is—

1. The combination of hinging-irons $d^1$, having two or more eyes, $d^2\ d^3$, with the perforated overhanging goose-necks of the rake-axle, as and for the purpose described.

2. The combination of the treadle $H^1$, binding-loop $H^5$, spring locking-bar $G^1\ G^2$, bevel-latch $G^4$, and catch $f$, as and for the purpose set forth.

3. The back-acting treadle $H^1$, having the angular depression $H^2$, in combination with the latch of bar $G^2$, in the manner and for the purpose described.

4. The combination of the crank-shaft J, having two arms, $J^1\ J^3$, the spring $k$, inclined trip $J^4$, the flanged trip-plate C, link S, collar $J^5$, and treadle $K'$, and rake-head E, substantially as and for the purpose described.

5. The plates C $D'$, with central eyes and bevel surfaces $a\ a'$, in combination with the hubs of the wheels, as and for the purpose set forth.

JAMES HOLLINGSWORTH.

Witnesses:
DAVID FALES,
NOBLE B. JUDAH.